United States Patent [19]

Merstallinger et al.

[11] 3,924,926

[45] Dec. 9, 1975

[54] POLARIZING ATTACHMENT FOR MICROSCOPES HAVING INCLINED BINOCULAR EYEPIECE

[75] Inventors: Kurt Merstallinger; Klaus P. Schindl, both of Vienna, Austria

[73] Assignee: C. Reichert Optische Werke, AG, Vienna, Austria

[22] Filed: May 28, 1974

[21] Appl. No.: 473,593

[52] U.S. Cl. .................. 350/34; 350/14; 350/35
[51] Int. Cl.² .................. G02B 7/88; G02B 21/06; G02B 21/20
[58] Field of Search ............ 350/48, 49, 50, 51, 54, 350/33, 34, 35, 14, 15

[56] References Cited
UNITED STATES PATENTS

| | | | |
|---|---|---|---|
| 1,528,931 | 3/1925 | Lihotzky | 350/35 |
| 1,958,280 | 5/1934 | Patterson et al. | 350/34 |
| 2,536,718 | 1/1951 | Brandon | 350/54 |
| 2,785,601 | 3/1957 | Francon | 350/14 |
| 3,458,244 | 7/1969 | Klein | 350/50 |
| 3,722,979 | 3/1973 | Mikami | 350/54 |

FOREIGN PATENTS OR APPLICATIONS

| | | | |
|---|---|---|---|
| 1,282,315 | 11/1968 | Germany | 350/14 |

Primary Examiner—Ronald L. Wibert
Assistant Examiner—Jon W. Henry
Attorney, Agent, or Firm—Alan H. Spencer; William C. Nealon; H. R. Berkenstock, Jr.

[57] ABSTRACT

A polarizing attachment for microscopes having an inclined binocular eyepiece includes an optical system having an intermediate image plane in which the analyzer, or other modifying element can be positioned.

9 Claims, 5 Drawing Figures

POLARIZING ATTACHMENT FOR MICROSCOPES HAVING INCLINED BINOCULAR EYEPIECE

BACKGROUND OF THE INVENTION

Many microscopes, as for instance polarizing microscopes, interference microscopes, etc. utilize polarized light. In such microscopes, limitations existed for full applicability in conjunction with polarized light coming from the specimen due to the fact that certain essential optical elements in the ray path interferred with the polarization and/or with positioning the analyzer. In such cases, it was necessary to locate polarizing means in an area unrestricted by such interfering optical elements, for instance, in front of the deflecting prism for the binocular inclined eyepieces. There are, however, polarization methods in which an element influencing light polarization, for instance, compensating wedge or prism, half-shade plate, etc. is most desirably positioned in an intermediate image plane. Such methods had to be restricted to a monocular microscope with an undeviating view whereby comfort of use and facility of observation were reduced substantially.

In other techniques using polarization, the element, for instance a Wollaston prism, influencing light polarization is arranged in or near the objective pupil. This pupil, however, is quite frequently inaccessible in conventional microscope objectives.

In all cases, a polarizing element (the analyzer) is used in addition to the element influencing the polarization if this element influencing polarization is not a polarizer itself.

In conjunction with such instruments for microscopy or in attachments therefore, it is often desirable to produce with the polarized light, an intermediate image of the specimen field or of the exit pupil of the objective while avoiding all optical elements interfering with polarization.

An arrangement of inclined eyepieces containing two oculars, possesses a beam splitter usually in the form of a prism with partially transmissive mirror and an additional ray-deflecting element interfering with preferred positioning of the polarizing element.

In any conventional microscope, the ocular is the only place where any intermediate image is produced, and the intermediate pupil usually lies in the eye-pupil of the eyepiece or eyepieces. If one wanted to utilize the intermediate image in the ocular to house a polarizing element, then the presence of the beam-splitting prism would interfere with positioning a single polarizing element or one would have to provide two elements influencing polarization in both eyepieces. For these reasons, only a monocular body is used with this arrangement.

THE INVENTION

The invention comprises an interference-free optical arrangement and preserves the advantage of binocular inclined eyepieces in the microscope.

The invention pertains to an optical arrangement for attachment to microscopes which have an inclined binocular eyepiece and disengageable or shiftable ray-deflecting element, in conjunction with which the ray path coming from the objective is conducted, when the ray-deflecting element is shifted over an alternate observation axis with further ray-deflecting elements until it finally rejoins the original observation axis leading from the ray-deflecting element before shifting, to the inclined binocular. In front of the first ray-deflecting element in the attachment is at least one intermediate image of the object and optionally, an image of the exit pupil of the objective, with provision for positioning an optical element, for instance an analyzer, a half-shade plate, a Wollaston prism, etc., in the plane of the intermediate image of the object or of the pupil.

Such an arrangement makes it possible to accommodate an element influencing the polarization, as for instance, an analyzer, etc., in the ray path even before the first deflection along the observation axis leading from the microscope objective because the shifted ray-deflecting element required when shifting the observation axis toward the inclined binocular eyepiece now continues in a straight line along the alternate observation axis. Along this alternate observation axis and prior to the first deflection of the ray path, an intermediate image of the object is formed by image forming optics and optionally, an image of the exit pupil of the objective can also be formed behind the intermediate object image. There can be several such intermediate images formed.

The invention is clarified with further details below, for better comprehension by reference to the drawings in which, in a schematic and simplified form, two exemplifications according to the invention are demonstrated with particular optics exemplified for one embodiment.

Figure 1:
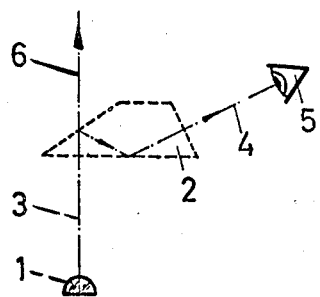
FIG. 1 shows a known arrangement of the ray path with a swing-out ray-deflecting element.

In FIG. 1, the objective of a microscope is designated by 1; ray-deflecting element 2, here indicated by a broken line as a prism, which element can be shifted out of the ray path 3 from the objective to the ray deflecting element 2 and toward inclined binocular eyepiece 5 from the lower reflecting surface along ray path 4. The direct continuation of the ray path 3 when the prism 2 is shifted is indicated by 6. Such an arrangement can be servicable by adaption through the present invention for the application of polarization.

Figure 2:
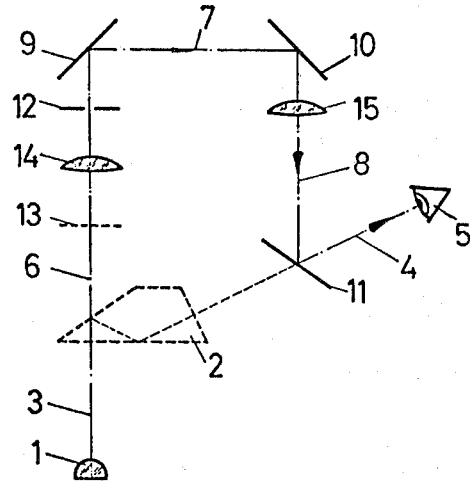
FIG. 2 shows one arrangement according to the invention.

The invention according to FIG. 2 is referred to as one method of adapting such a system. In FIG. 2, displaceable ray-deflecting element 2 is indicated by a dotted line permitting alternate observation axis to continue, unhindered, upward along ray path 6. In ray path 6 there are located before the first deflection, an intermediate object image plane 13 conjugate with the normal object image in the eyepiece, image forming optics 14, and an intermediate exit pupil 12 of the objective 1 of the microscope. The mirror 9 constitutes the first of the deflecting elements of the attachment for the formation of the arrangement according to the invention, and deflects the ray in the direction 7 to a further deflecting mirror 10, whence it is conducted in direction 8 to the last mirror 11, so as to finally coincide from there with the original observation ray path 4 from the temporarily disengaged ray-deflecting element 2, to inclined binocular eyepiece 5.

After the image forming optics 14, there is generally located additional image forming optics 15 in the ray path, and moreover, more than one intermediate image 13 of the object and the objective pupil can be present, in conjunction with which the respective number of the image forming optics is correspondingly increased.

It is clear that additional intermediate images or objective pupil images can also lie in that part of the ray path which still lies in front of the first deflecting element 9. This is of substantial significance for the application of the invention in microscopy techniques using polarized light. In or near the intermediate image, an optical element, e.g. an analyzer, half-shade plate or Wollaston prism which influences the polarization and can be housed because no elements interferring with polarization are encountered prior thereto.

The arrangement is possible to provide the ray-deflecting element 11, a mirror for instance, located on a slide in the base microscope with the displaceable first ray-deflecting element 2 prism which is moveable to bring either one or the other into the ray path.

Figure 3:
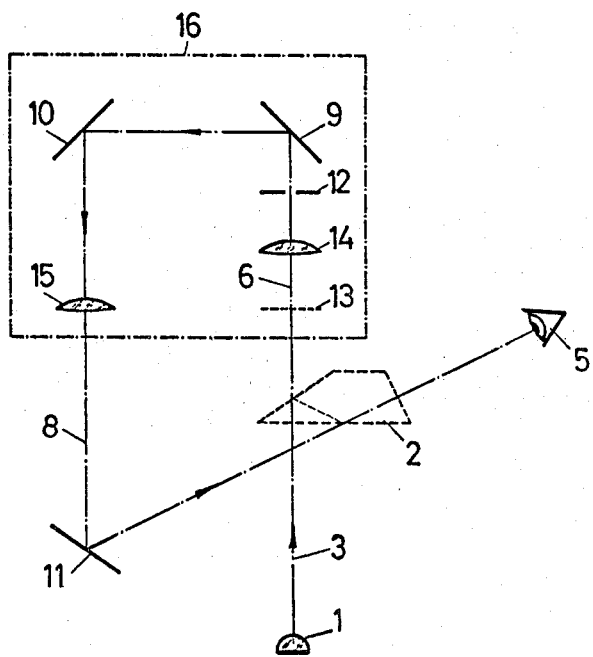
FIG. 3 shows another arrangement according to the invention.

FIG. 3 shows another arrangement, which for reasons of space, is usually more desirable for microscopes having inclined binocular eyepieces. The entire alternate ray path is conducted, when the element 2 is disengaged in a loop from objective 1 to the inclined binocular eyepiece 5. Ray path 3 in the microscope continues upwards along alternate observation axis 6 of attachment 16 which is indicated by the dot-dash line. In this attachment are located first image forming optics 14, the ray-deflecting elements 9 and 10, and additional image forming optics 15. The ray-deflecting element 11 is preferably housed in the frame microscope. By so doing, there is produced a relatively simple attachment and the basic microscope requires only minor alterations, such as the insertion of the deflecting element 11 and of an aperture, which can be closed for the ray path between the deflecting elements 10 and 11. With this arrangement, ray deflecting element 11 can be permanently positioned in the frame of the microscope and it is unnecessary to make it interchangeable with element 2. Here, also naturally more than one intermediate object, image 13 and exit pupil image 12 can be present, as already mentioned in connection with FIG. 2.

Figure 4:
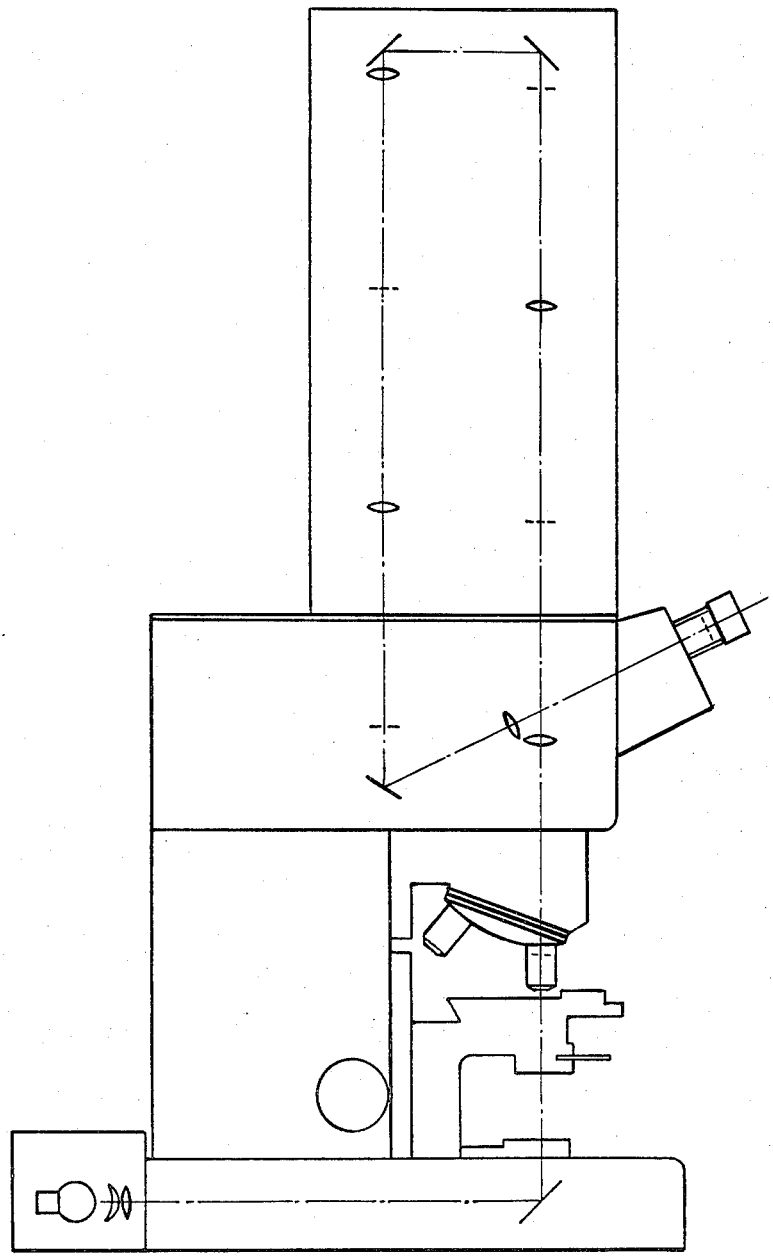
FIG. 4 shows a microscope having the basic arrangement of FIG. 3.
Figure 5:
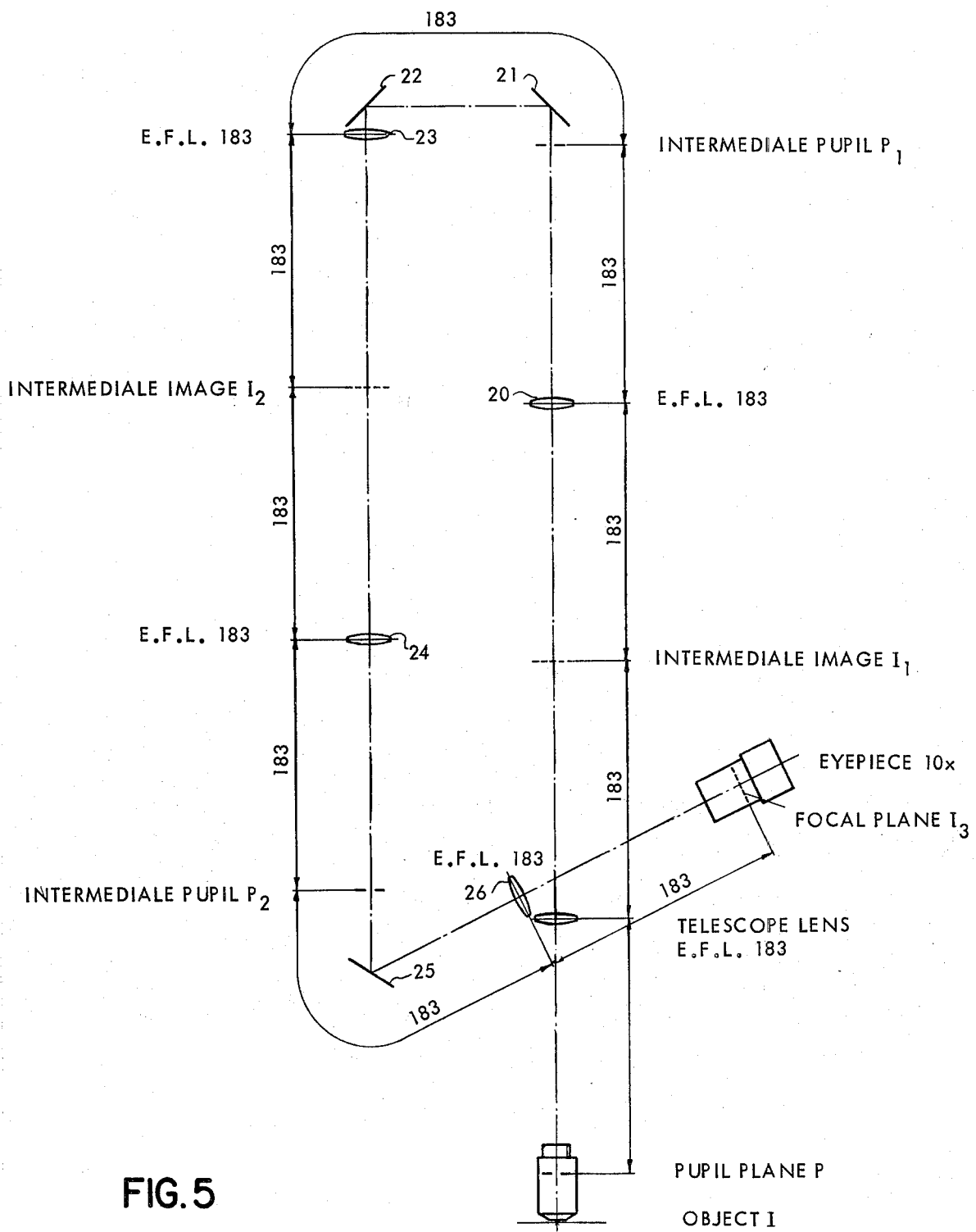
FIG. 5 shows optical particulars of the arrangement of FIGS. 3 and 4.

FIGS. 4 and 5 show in greater detail the optical systems of the attachment and the microscope with the embodiment of FIG. 3. The parameters for the optical system are not critical when the construction of FIG. 5 is observed. The first intermediate object image $I_1$ is located at the focal plane of the telescope objective of the microscope and is conjugate with normal image plane $I_3$ of the eyepiece. A plurality of lenses 20, 23, 24 and 26, having the same effective focal length as that of the telescope objective, i.e. 183mm, are positioned on the alternate observation axis at regular intervals beginning 366mm from the telescope objective as shown. The first deflector 21 is located more than 549mm from the objective to allow intermediate pupil image $P_1$ to occur prior to deflection. Deflectors 22 and 25 direct the observation path toward the inclined binocular eyepiece and lens 26 is thus the optical equivalent of the telescope objective to present the object image to the binocular for viewing. It is obviously economically feasible to utilize identical lenses for telescope objectives and lenses 20, 23, 24 and 26.

What is claimed is:

1. In a microscope having an objective system with an exit pupil and a chosen effective focal length, an inclined binocular eyepiece having a focal plane therein, each of these elements being aligned along an observation axis, and a beam deflector alternately positionable on and off of said observation axis between said objective system and said eyepiece, the improvement comprising an alternate observation axis such that said objective system provides an intermediate object image plane on said alternate observation axis when said beam deflector is positioned off said observation axis, said intermediate object image plane being located at a distance from said objective system substantially equal optically to said effective focal length, said intermediate object image plane and said eyepiece focal plane being optically-spaced equidistant from said objective system, an optical modifying element positioned at said intermediate object image plane, a plurality of deflectors positioned on said alternate observation axis subsequent to said intermediate object image plane to direct said alternate observation axis from said intermediate object image plane toward said eyepiece, and a lens system aligned along said alternate observation axis after said intermediate object image planes to re-image said object in the eyepiece focal plane whereby polarized light from the objective system reaches said optical modifying element without being influenced by said plurality of deflectors.

2. The improvement of claim 1 wherein said objective system includes a telescope objective providing said chosen effective focal length.

3. The improvement of claim 2 wherein said lens system has a plurality of lenses each having a focal length substantially equal to said effective focal length and each being located at a regular interval along said alternate observation axis, said regular interval being substantially twice said effective focal length.

4. The improvement of claim 3 wherein the first of said plurality of lenses is spaced from said telescope objective by substantially twice said effective focal length.

5. The improvement of claim 4 wherein each of said plurality of lenses and said telescope objective are identical.

6. The improvement of claim 4 wherein the effective focal length is 183mm.

7. The improvement of claim 4 wherein the first of said plurality of deflectors is located on said alternate observation axis more than a distance of two effective focal lengths from said intermediate image plane to provide an intermediate objective exit pupil plane prior to a beam deflecting element.

8. The improvement of claim 7 wherein there are four lenses in said plurality of lenses, said effective focal length is about 183mm, the first of said four lenses being spaced from said telescope objective about 366mm and the last of said four lenses being spaced from said eyepiece focal plane about 183mm.

9. The improvement of claim 3 having at least one additional pair of lenses, each lens of said pair being aligned along said alternate observation axis at said regular intervals to provide a like number of additional intermediate image planes.

* * * * *